United States Patent
Webbeking et al.

(10) Patent No.: US 7,232,987 B2
(45) Date of Patent: Jun. 19, 2007

(54) INSTRUMENT AND METHOD TO MEASURE AVAILABLE LIGHT ENERGY FOR PHOTOSYNTHESIS

(76) Inventors: Victor Webbeking, 11333 28th Ave. NE., Seattle, WA (US) 98125; Karen Main, 1304 W. 4th St., Red Wing, MN (US) 55066; Loyd Kepferle, 374 Woodridge Dr., Busy, KY (US) 41723; Larry Wendell Wilson, 10 Keenfield St., Richmond, KY (US) 40475

( * ) Notice: Subject to any disclaimer, the term of this patent is extended or adjusted under 35 U.S.C. 154(b) by 0 days.

(21) Appl. No.: 11/440,492

(22) Filed: May 25, 2006

(65) Prior Publication Data

US 2007/0013897 A1    Jan. 18, 2007

Related U.S. Application Data (60) Provisional application No. 60/684,333, filed on May 25, 2005.

(51) Int. Cl.
*G01J 1/42* (2006.01)
*H01J 40/14* (2006.01)

(52) U.S. Cl. ............................... 250/226; 250/214 AL; 356/218

(58) Field of Classification Search ................ 250/226, 250/214 AL; 356/213, 218
See application file for complete search history.

(56) References Cited

U.S. PATENT DOCUMENTS

| | | |
|---|---|---|
| 4,029,959 A | 6/1977 | Cottingham et al. |
| 4,178,101 A | 12/1979 | Booth |
| 4,286,327 A | 8/1981 | Rosenthal et al. |
| 4,498,767 A | 2/1985 | McGovern et al. |
| 4,595,290 A | 6/1986 | Nose et al. |
| 4,678,330 A * | 7/1987 | Gutschick et al. ........... 356/222 |
| 4,682,897 A | 7/1987 | Saito et al. |
| 4,847,483 A * | 7/1989 | Nishibe et al. ........ 250/214 AL |
| 4,997,146 A | 3/1991 | Weyandt, Jr. |
| 5,305,233 A | 4/1994 | Kawagoe et al. |
| 5,352,884 A | 10/1994 | Petrick et al. |
| 5,615,294 A | 3/1997 | Castonguay |
| 5,640,246 A | 6/1997 | Castonguay |
| 5,990,628 A | 11/1999 | Birrell |
| 6,462,819 B1 | 10/2002 | Terauchi et al. |
| 6,590,648 B1 | 7/2003 | von Orelli et al. |
| 6,679,608 B2 | 1/2004 | Bechtel et al. |
| 6,693,670 B1 | 2/2004 | Stark |
| 6,720,545 B2 | 4/2004 | Mizuhara et al. |
| 6,737,629 B2 | 5/2004 | Nixon et al. |
| 2002/0100865 A1 | 8/2002 | Nixon et al. |
| 2003/0058342 A1 | 3/2003 | Trajkovic |
| 2005/0030526 A1* | 2/2005 | Tanaka ....................... 356/222 |
| 2005/0219517 A1* | 10/2005 | Tanaka et al. .............. 356/221 |
| 2006/0038983 A1* | 2/2006 | Bickel et al. ................ 356/225 |

* cited by examiner

*Primary Examiner*—John R. Lee
(74) *Attorney, Agent, or Firm*—James M. Francis (57) ABSTRACT

The present invention is an accumulated light meter that generates data concerning the quantity of photosynthetically active radiation available over a measured period of time. The device can calculate a daily light integral (DLI) that corresponds to the amount of light required by certain plants in order to optimize photosynthesis. The device also possesses the ability to filter out the effect that wavelengths of unproductive light have on the calculated values since not all light is conducive to photosynthesis and different species of plants can utilize different wavelengths of light in dissimilar ways.

24 Claims, 5 Drawing Sheets

FIG. 6

INSTRUMENT AND METHOD TO MEASURE AVAILABLE LIGHT ENERGY FOR PHOTOSYNTHESIS

CROSS REFERENCE TO RELATED APPLICATIONS

This application claims priority from U.S. Provisional Application No. 60/684,333 filed on May 25, 2005. This application relates to an accumulated sunlight measurement device. The entire disclosure contained in U.S. Provisional Application No. 60/684,333 including the attachments thereto, are incorporated herein by reference.

BACKGROUND OF THE INVENTION

1. Field of the Invention

This invention relates generally to a light measurement device. More specifically this invention relates to a light measurement device attuned to the visible spectrum. Even more specifically this device relates to a sunlight integration instrument whose output is accumulated light over a given time period.

2. Problems in the Art

Photosynthesis is an important biochemical process in which algae, plants, and some bacteria convert the energy of sunlight to chemical energy. The chemical energy is used to drive reactions such as the formation of sugars or the fixation of nitrogen into amino acids. Generally speaking, photosynthesis is controlled by four factors, (1) temperature, (2) $CO_2$ concentration, (3) light irradiance, and (4) light wavelength. Unless plants are grown in controlled environments, man has little control over temperature and $CO_2$ concentration. However, in many instances man has the ability to plant crops and cultivate gardens in areas that receive the most direct sunlight, thus has some control over the irradiance and wavelength variables.

Irradiance is a radiometric term for the power of electromagnetic radiation at a surface, per unit area or, more specifically, when power is incident on the surface. The SI units for irradiance is watts per square meter ($W \cdot m^{-2}$). Irradiance is sometimes called intensity, but this usage can lead to confusion with radiant intensity, which has different units. Table 1 depicts common radiometric units.

TABLE 1

| Radiometric Units - SI | | |
|---|---|---|
| Irradiance | watt per square meter | $W \cdot m^{-2}$ |
| Radiance | watt per steradian per square meter | $W \cdot sr^{-1} \cdot m^{-2}$ |
| Radiant emittance/ Radiant exitance | watt per square meter | $W \cdot m^{-2}$ |
| Radiant energy | joule | J |
| Radiant flux | watt | W |
| Radiant intensity | watt per steradian | $W \cdot sr^{-1}$ |
| Spectral irradiance | watt per meter$^3$ or watt per square meter per Hertz | $W \cdot m^{-3}$ or $W \cdot m^{-2} \cdot Hz^{-1}$ |
| Spectral radiance | watt per steradian per meter$^3$ or watt per steradian per square meter per Hertz | $W \cdot sr^{-1} \cdot m^{-3}$ or $W \cdot sr^{-1} \cdot m^{-2} \cdot Hz^{-1}$ |

All of these radiometric quantities characterize the total amount of radiation present, at all frequencies. It is also common to consider each frequency in the spectrum separately. When this is done for radiation incident on a surface, it is called spectral irradiance, and has SI units $W \cdot m^{-3}$, or commonly $W \cdot m^{-2} \cdot nm^{-1}$. If a point source radiates light uniformly in all directions and there is no absorption, then the irradiance drops off in proportion to the distance from the object squared, since the total power is constant and it is spread over an area that increases with the square of the distance from the source.

The accurate measurement of available sunlight is difficult. Judgment based on visual observation is completely inadequate since the human eye, which accommodates a brightness range varying in intensity over a factor of 100,000 or more, ordinarily cannot discern changes of a factor of two or three or four. But a factor of two might be critical for the health of a plant. Furthermore, research has shown that identical plants, placed as little as ten feet apart in visually identical conditions, can experience markedly different growth rates where the only differing environmental variable that could be detected was a minor difference in useful light that resulted in differences in irradiance on the surface of the plants at both locations. It is clear that a sensitive light measurement instrument is required to evaluate light conditions to optimize photosynthetic promoted growth in plants.

The measurement of light intensity, or quantification of light received, by an instrument at any given moment is a well known process involving the use of a light meter or lux meter. Several systems of light meters have been used, the three most common being selenium, CdS, and silicon light meters.

Selenium and silicon light meters use sensors that are photovoltaic. These sensors generate a voltage proportional to light exposure. Selenium sensors generate enough voltage for direct connection to a meter. Silicon sensors need an amplification circuit and require a power source like a batteries to operate. CdS light meters use a sensor based on photoresistance. These also require a battery to operate. Most modern light meters use silicon or CdS sensors. They indicate the exposure either with a needle galvanometer, or on a LCD screen. Typical uses are to determine light intensity for photographic applications such as determining proper exposure. Given a film speed and shutter speed, the meter will show the f-stop which would give a neutral exposure of an ideal gray slate. These instruments have also been adapted to measuring the light intensity for agricultural or gardening applications.

Typically, the measured light covers the entire range of wavelengths for which the various kinds of chlorophyll (and other photosynthetic compounds) in plants are effective in converting light to plant energy. With a bit of arbitrariness, this has been defined as wavelengths over the range of 400 to 700 nanometers. This is roughly the same range that a human eye can perceive—i.e., colors from violet, then blue, green, yellow, orange and finally red. Eye sensitivity peaks in the center of this range (green, about 500-550 nanometers) and falls off to almost zero at the extremes, while the typical light sensor has uniform sensitivity over that wavelength range (or light bandwidth).

The spectrum available for photosynthesis is limited to visible light because infrared light does not contain enough energy for photosynthesis and ultraviolet light has too much energy. Ultraviolet light intercepted by plants can create free radicals, which can break chemical bonds in an organism. The wavelength and quantity of light is also important in other biological processes such as the inhibition of hypocotyl elongation. The hypocotyl is the primary organ of extension of a young plant and develops into the stem.

The light reactions of photosynthesis (the reactions that convert light energy to chemical energy in the form of ATP and NADPH and produce $O_2$ as a by-product) occur in the thylakoid membranes of the grana contained within chloroplasts, primarily in palisade mesophyll tissue of terrestrial plant leaves. Thylakoid membranes contain several protein pigments (phytochromes), including chlorophyll $\alpha$, chlorophyll $\beta$, and carotenoids. Chlorophyll $\alpha$ participates directly in the light reactions of photosynthesis. It absorbs mainly blue-violet and red light, and reflects green light. This correlates well with overall photosynthetic efficiency, indicating that this molecule is the most important to the process of photosynthesis. However, energy absorbed by chlorophyll $\alpha$ is not the only energy that can be used in photosynthesis. Chlorophyll $\beta$ is very similar in structure to chlorophyll $\alpha$, but it absorbs mainly blue and orange light, reflecting yellow-green. It then transfers the collected energy to chlorophyll $\alpha$, which actually utilizes it in the light reactions. Some carotenoids can also transfer collected energy to chlorophyll $\alpha$. The absorption spectra of chlorophyll $\alpha$ and chlorophyll $\beta$ are shown on graph below. Peaks of the graph indicate high rates of absorption; troughs are low rates. Chlorophyll absorption efficiency correlates closely with overall photosynthetic efficiency, indicating that chlorophyll is the main photosynthetic pigment. Carotenoids such as xanthophylls, anthocyanins, and carotenes absorb mainly blue-green light, reflecting, thus, yellow-orange. Some carotenoids act like chlorophyll $\beta$ in passing their energy on to chlorophyll $\alpha$ while others help to diffuse excess light energy, which could denature the chlorophyll.

Photons contain varying amounts of energy based on their wavelength; shorter wavelengths contain more energy, therefore blue wavelengths are very high-energy, one reason why they are absorbed by all three photosynthetic pigments and are highly efficient at powering photosynthesis. When a pigment absorbs a photon of light energy, one of its electrons gains energy. It is very unstable, and soon falls back to its ground state, releasing heat and/or light along the way. In photosynthesis, however, excited electrons are donated to a primary electron acceptor before they revert to their former state.

Uniform sensitivity in a light meter over the visible spectrum can give non-ideal results, since plants generally don't use light at wavelengths in the center of that range, thus revealing why plant leaves appear green—green light is reflected by leaves, while other colors of light are absorbed and used by plants. Under a forest canopy, more green light is present than would be "out in the open" because of the preferential absorption of other colors, and therefore an "ideal" light sensor gives too high a reading—it is reporting all that green light which isn't used by plants. This becomes extremely complicated when one takes into account the fact that not all plants absorb light in the same way or of the same wavelengths. Thus additional wavelengths may need to be filtered out as well to achieve accurate results.

Dual sensor systems are described by U.S. Pat. No. 3,746,430 to Brean et al., U.S. Pat. No. 4,580,875 to Bechtel et al., U.S. Pat. No. 4,793,690 to Gahan et al., U.S. Pat. No. 4,886,960 to Molyneux et al., U.S. Pat. No. 4,917,477 to Bechtel et al., U.S. Pat. No. 5,204,778 to Bechtel, U.S. Pat No. 5,451,822 to Bechtel et al., U.S. Pat. No. 5,715,093 to Shierbeek et al., U.S. Pat. No. 6,504,143 to Nixon et al., U.S. Pat. No. 6,359,274 to Nixon et al., and U.S. Pat. No. 6,737,629 to Nixon et al., each of which is incorporated herein by reference.

The use of dual sensor photodiodes as described by the patents by Nixon et al. as set forth in the previous paragraph use one photodiode to generate a charge in proportion to the amount of incident light. The device measures incident light across the visible spectrum. The resulting potential reflects the amount of incident light accumulated at the sensor over a period of time thus providing a measure of light over the accumulation period without resorting to the necessity of a mathematical integration process. One key component of the dual sensor technologies is the ability to measure noise with a second, shielded sensor and thereby improving the accuracy, precision and sensitivity of the device.

The Nixon et al. patents use logic to determine the length of time over which the photodiode and accompanying circuitry will collect the charge generated by light striking the photodiode. The circuitry is reset and a charge is collected over a predetermined time period. The amount of charge collected over that time period determines the length of an electrical pulse generated by the circuitry and the length of this pulse is the signal parameter that indicates the quantity of light striking the photodiode over that time period.

A particular method that is used is to couple the photodiode with a capacitor via a switch. The switch between the photodiode closes and the capacitor is charged up to a fixed voltage. Once the predetermined time period has passed, the switch changes and the charge on the capacitor is dissipated at a fixed rate. The length of the discharge determines the length of the pulse which indicates the intensity of the light or glare.

U.S. Pat. No. 4,249,109 by Ogawa discloses and claims a light digitizing circuit for an electronic flash drive. Ogawa uses a light sensitive sensor to develop a current upon being exposed to light. In particular, it is intended to measure the light from a flash and stop the flash once a predetermined quanity of light has reached the aperture. The light sensor in at least one embodiment is a photodiode which creates a current when exposed to light. This current charges a capacitor, and when the capacitor reaches a predetermined voltage, it is discharged. A counter keeps track of how many times the capacitor is charged and discharged, and thereby a measurement of light exposure is achieved. Each time the capacitor is charged represents a quantity of light. More intense light will charge the capacitor faster, and less intense light will charge the capacitor more slowly, but the quantity of light having reached the photodiode is still indicated by the total charge on the capacitor.

U.S. Pat. No. 5,583,605 by Sakamoto claims and discloses a photoelectric current converting circuit. Sakamoto is directed to a control circuit for adjusting an electronic flash on a camera. The circuit generally comprises a capacitor, a voltage supply circuit, a comparator, an outputting circuit, a discharging circuit, and a plurality of current sources and a selecting member to select one of the current sources. The current source associated with this circuit is, in the preferred embodiment, a photodiode. The electric current generated by the photodiode is output to a current converting circuit which uses a capacitor and a comparator to generate a string of logic level voltage pulses. The voltage pulses are counted by a counter circuit to integrate the current generated by the photodiode and the output from the counter circuit is compared with the output from the standard value circuit. When the value of the counter output equals or exceeds the standard from the standard value circuit, the circuit generates a stop signal to the light emitting circuit so that, in this case, the flash for a camera is stopped.

SUMMARY OF THE INVENTION

The present invention uses a light transducer to measure the quantity of photosynthetically useful light (PAR or Photosynthetic Active Radiation) present in a given location over a given period of time. In a preferred embodiment the transducer used is a photodiode. As light passes through an optical filter to remove unwanted wavelengths, the photodiode charges a capacitor to a fixed voltage, which causes a logic change of state in a tri-state gate, or buffer, associated with a microprocessor. The microprocessor monitors the pulse output of a high-speed clock and counts the pulses while the capacitor charges to the set voltage. When the tri-state gate senses the logic change of state, the microprocessor stops counting and the number of pulses indicates the amount of time it took the capacitor to reach the set voltage. The rate of sunlight striking the photodiode can then be calculated from the known pulse rate, the photodiode characteristics, and the value of the set voltage of the capacitor. This rate is treated as the rate over the whole time between each start of the capacitor charge, but the capacitor only takes a fraction of a second to charge and the capacitor may be reset every second or less.

The microprocessor in the preferred embodiment is programmable and capable of storing data to provide information over days, weeks, or months. The frequency at which the measurements are taken is also adjustable. The system can accommodate different types of capacitors but the particular capacitor used must have good repeatability.

One embodiment utilizes a leveling bubble to aid in proper positioning since a level instrument would provide the most repeatable and reproducible measurements. The device can also be incorporated with a fitting (threaded or otherwise) that would allow it to be mounted on a tripod or other stabilizing platform. An additional embodiment would have the device serving as a platform from which various instruments could be mounted and the data recorded. An alarm or other notification system could be easily incorporated to notify the user of specific results of interest. An integrated database could also be easily incorporated into the device so that a range of plant life could be indexed with appropriate DLI, soil condition, and moisture ranges to name a few environmental variables for that species. A data port for the transfer of data to a computer or similar device is also envisioned to be easily incorporated into the device. Such a data port could be RS232, USB™, FIREWIRE™, or similar hardware ports or could be wireless virtual data ports such as BLUETOOTH™, infrared, or RF (radio).

Remote monitoring is also possible which would allow the use of monitors in relatively inaccessible locations over long periods of time. Removal of the LCD display and incorporation with on-board wireless communication would drastically shrink the size of the unit down to approximately the size of a pen light.

It is envisioned that the improved ability to calculate DLI values and associate them with specific plant requirements will provide methods by which gardeners, farmers, and those generally interested in optimizing plant growth will be able to either modify the environment to increase the amount of PAR by reducing the canopy or removing other obstacles to light or select the proper plant for the available PAR in a given location.

Accordingly, those skilled in the art will appreciated that the concept upon which this invention is based may readily be utilized as a basis for the design of other structures, methods, and systems for carrying out the several purposes of the present invention. It is important, therefore, that the claims and specification be regarded as including such equivalent constructions insofar as they do not depart from the spirit of the present invention.

BRIEF DESCRIPTION OF THE DRAWINGS

Additional utility and features of the invention will become more fully apparent to those skilled in the art by reference to the following drawings, which illustrate the primary features of the preferred embodiment and numerous alternative embodiments.

DETAILED DESCRIPTION OF THE INVENTION

The detailed description below is for the preferred embodiments and is intended to explain the current invention. It is to be understood that a variety of other arrangements are also possible without departing from the spirit and scope of the invention.

Figure 1:
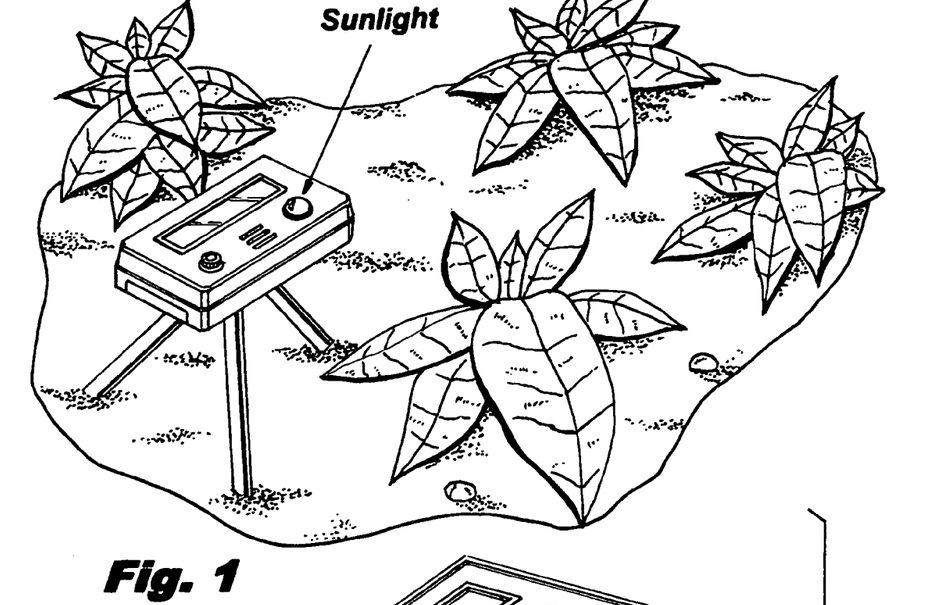
FIG. 1 shows the present invention mounted on a tripod and in use in a garden.
Figure 2:
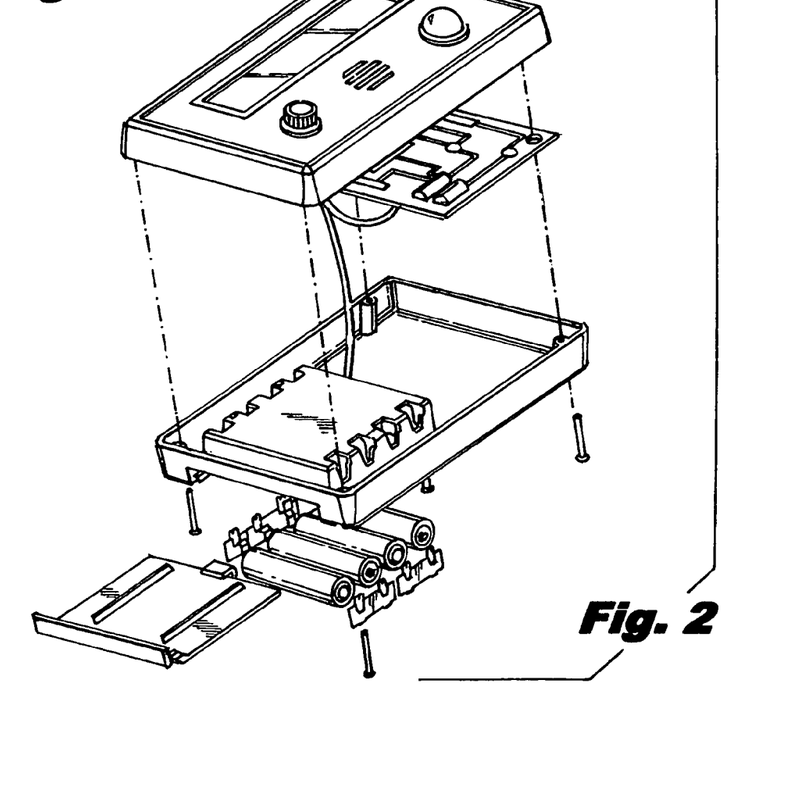
FIG. 2 is an exploded perspective view of the device of FIG. 1.
Figure 3:
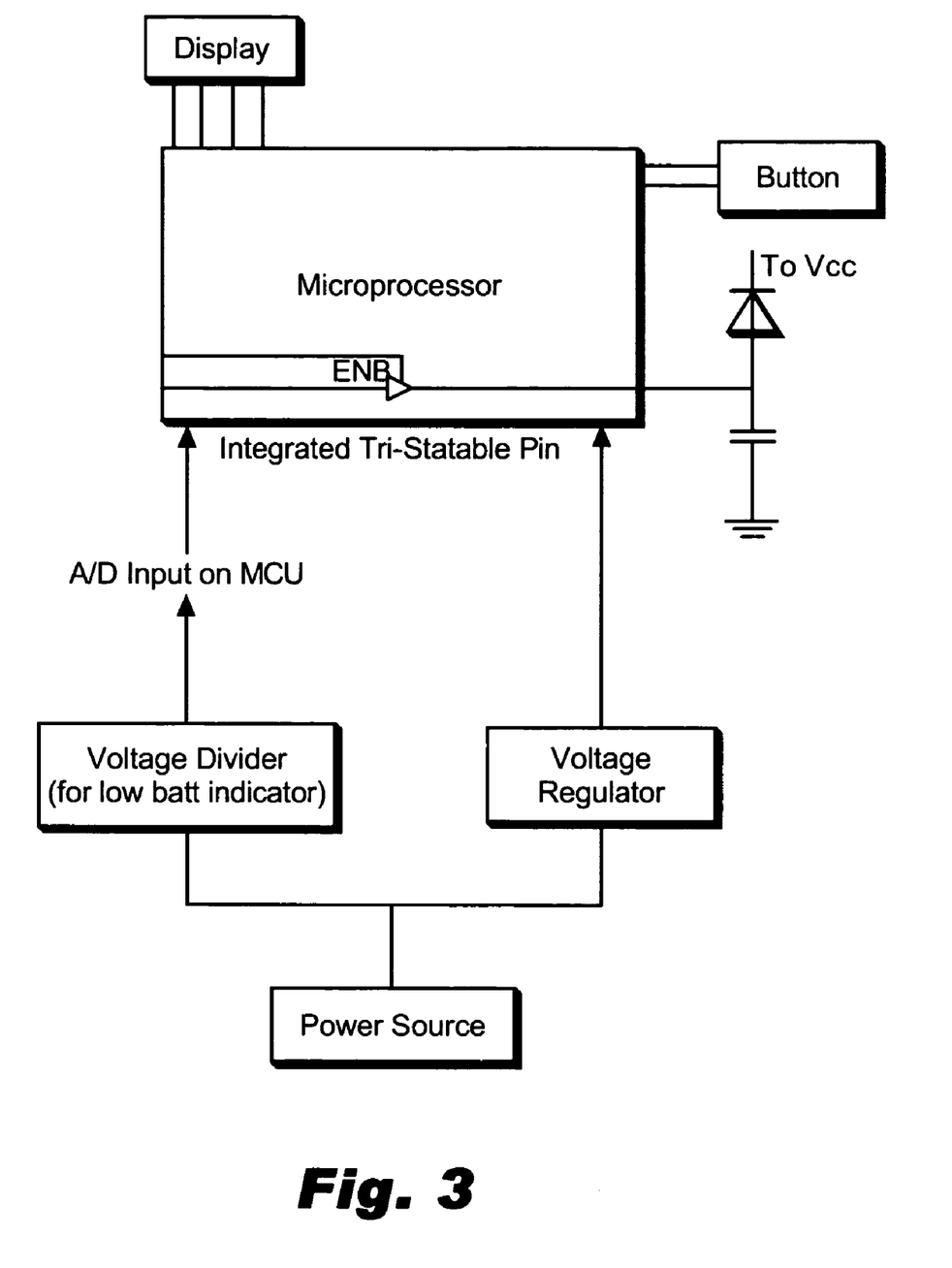
FIG. 3 is a schematic of the present invention.

FIG. 3 shows a schematic of several elements of the preferred embodiment which are located within a case. On an upper wall of the case, an optional optical filter can cover an aperture which passes through the upper wall and leads to a photodiode. The photodiode is electrically connected to a capacitor and a built-in tri-state gate, or tri-state buffer, of a microprocessor.

An optical filter over the aperture could function to selectively restrict the wavelengths of light which do not significantly contribute to the photosynthetic reactions of interest. The photodiode generates a current in direct proportion to the amount of light striking its photo-sensitive area. Current generated by the photodiode charges the capacitor up to a reference voltage which is determined by the tri-state gate. The reference voltage is a value that causes a logic state change at the tri-state gate. Ideally, wavelength filtering will take place by mathematical treatment of the data. Analog and digital filters could also be used to focus required calculations on energy supplied at specific wavelengths. Another embodiment would amplify signals from the wavelengths of interest.

Figure 5:
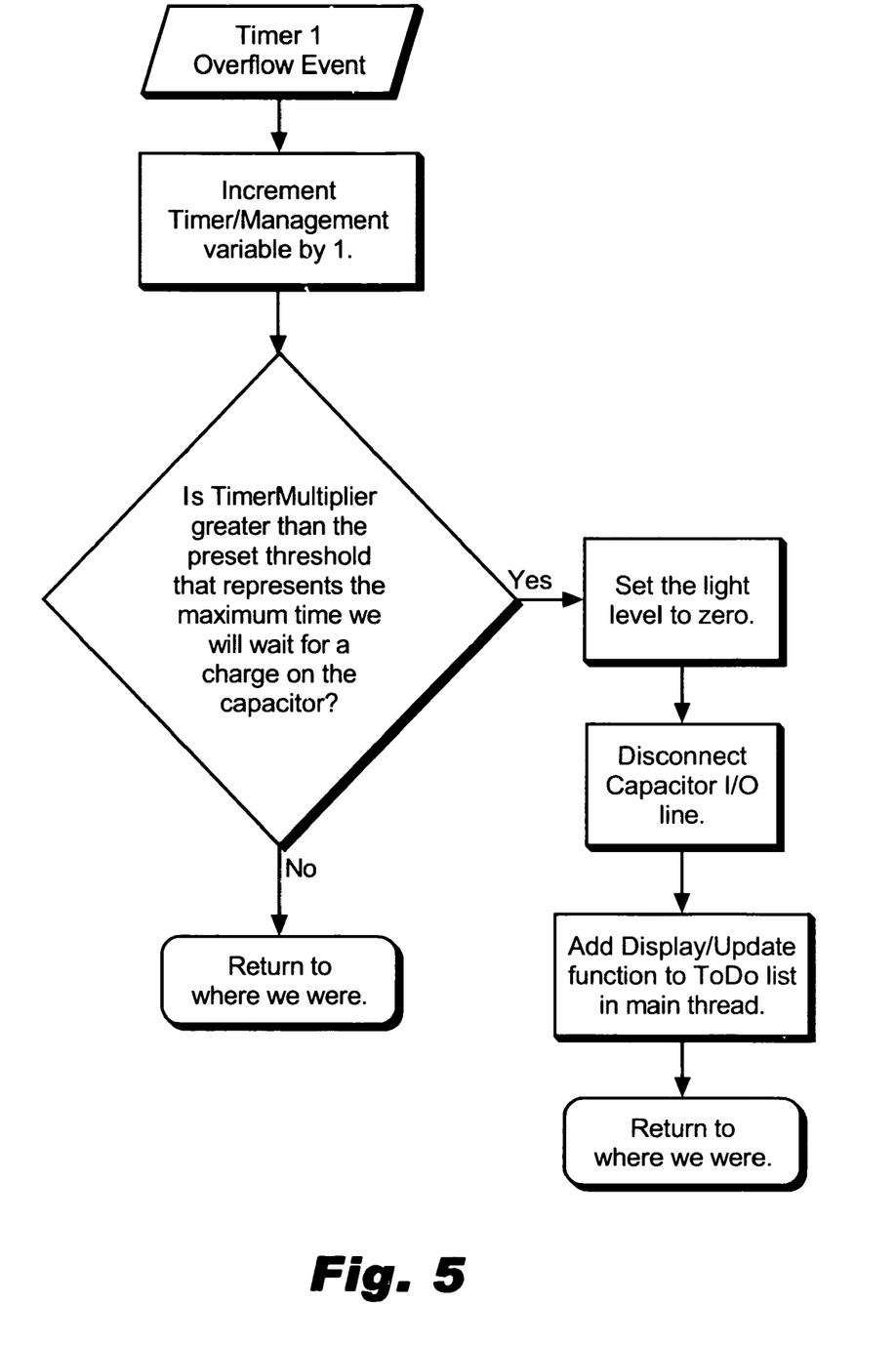
FIG. 5 is a flow diagram of the timer and counting process.
Figure 6:
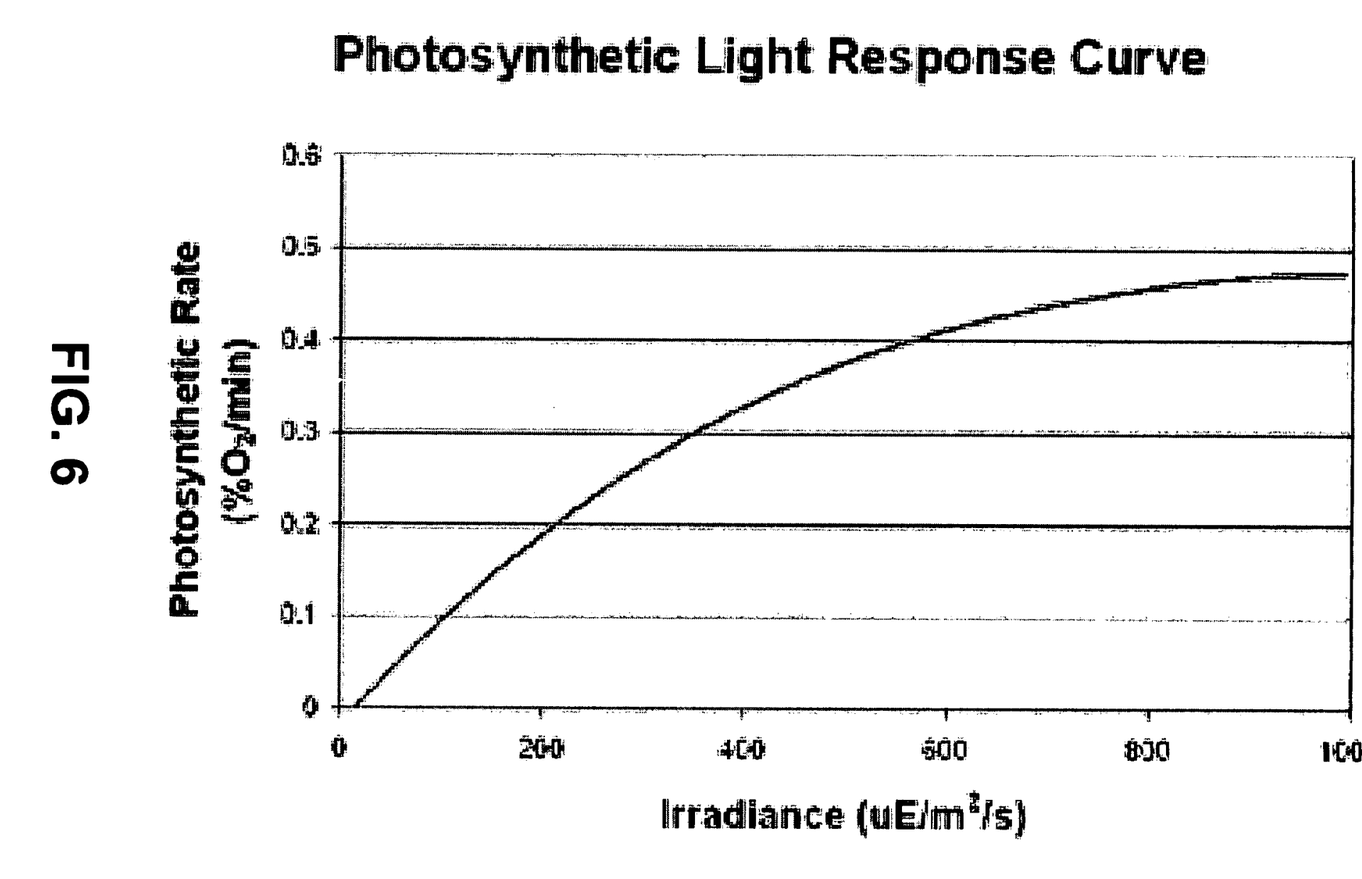
FIG. 6 is a demonstrative graph of photosynthetic rate plotted against irradiance.

The microprocessor has access to a built in clock which produces pulses at a high rate. The pulses can be counted by a reference clock counter which is a special register in the microprocessor. In the current embodiment, whenever the capacitor is reset to zero and starts charging, the counter is reset to zero and begins counting pulses. When the capacitor charges to the voltage that causes the logic change at the tri-state gate, an interrupt mechanism stops the counting of the pulses from the reference clock. The pulses occur at a known rate and the quantity of pulses provides a measurement of how long it took the capacitor to reach the logic level voltage. This in turn allows the time rate of current from the photodiode to be calculated which indicates the rate of light energy striking the diode during that charge of the capacitor. In the preferred embodiment, the frequency at which the capacitor is reset is adjustable and the rate of current and/or light are deemed to be constant over the period of the frequency. For example, if the system is set to sample the light rate every second and it only takes a fraction of a second to charge the capacitor, the calculated rate will be treated as the rate over the whole second, and the capacitor will not begin to recharge until a full second has elapsed from the beginning of the last charge.

The initial state of the system is such that the capacitor is uncharged and the built-in tri-state gate is set to input (which does not load the connection between the photodiode and capacitor) and the counter is set to zero. Light then comes into the system, charging the capacitor until the voltage across the capacitor creates a high enough potential that a logic state change is detected at the tri-state buffer. This in turn causes an interrupt in the microcontroller which halts the counter.

The system can then be reset by changing the tri-state buffer, otherwise known as a tri-state gate, to an output mode, with a logic state of "0" which discharges the capacitor and provides a path to ground for current through the photodiode. Once the capacitor has been discharged, the counter is reset to zero (to start the count again) and the mode of the tri-state buffer is changed to be an input with no load. The particular microcontroller used in the preferred embodiment has a fairly complicated bi-directional tri-state buffer setup on each I/O line. Even though the tri-state buffer is tied to the input pin, and effectively bi-directional, the software can be used to select if the I/O pin is to be strictly input, strictly output, interrupt on edge, high or low.

Figure 4:
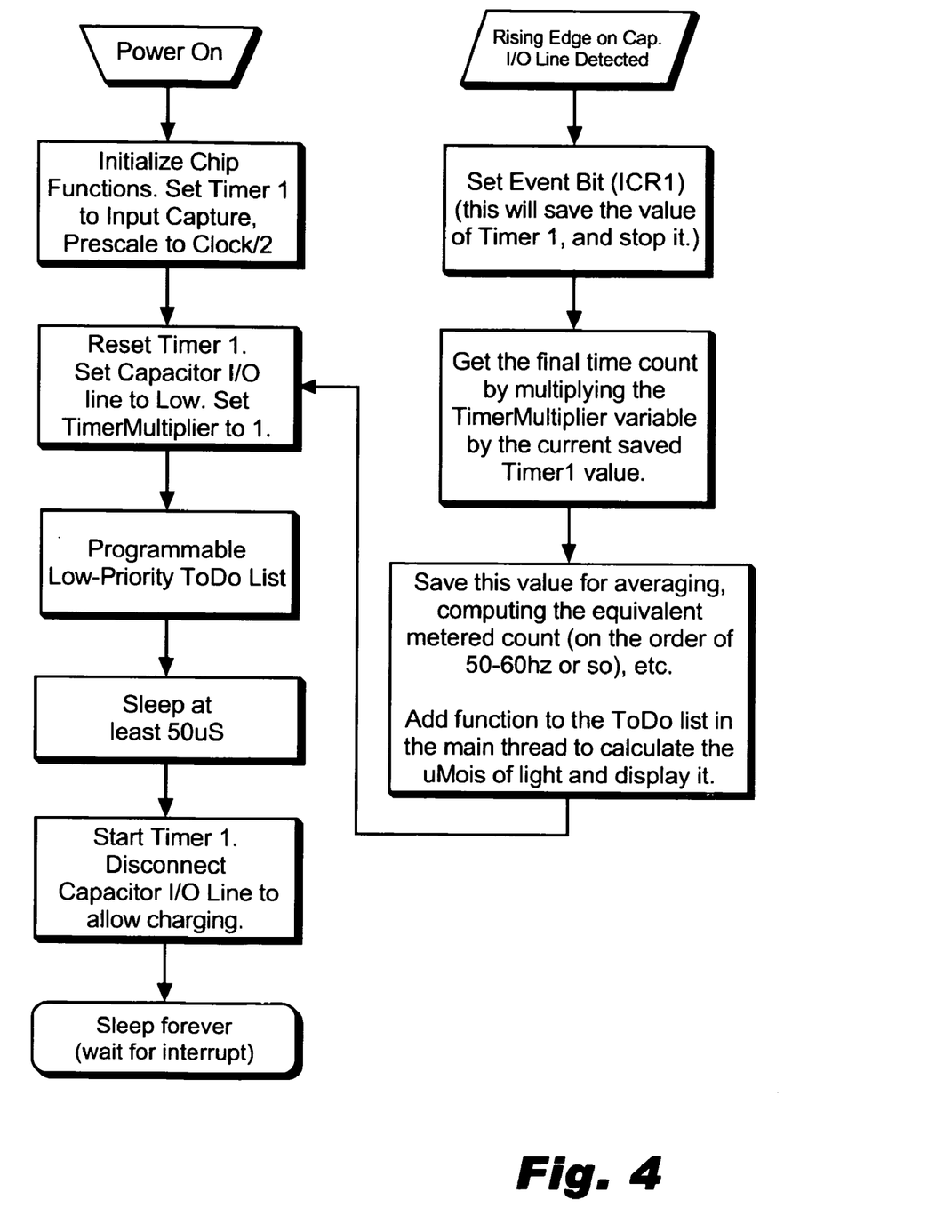
FIG. 4 is a process flow diagram of the preferred embodiment.

By controlling and repeating this process in the software, one can time how quickly the capacitor charges once it has been reset and that will indicate the amount of current passing through the photodiode for the purpose of measuring the average number of photons per meter striking the surface of the photodiode. Calculations are then performed within the software to convert this count into more traditional light units, such as umols of photons per meter squared per second. The microprocessor is capable of storing information for an extended period of time and therefore daily light integrals can be calculated over days, weeks, or months at the discretion of the user.

ELEMENTS OF THE PREFERRED EMBODIMENT DISCUSSED IN THE DETAILED DESCRIPTION

The optical filter component pre-conditions the incoming light in order to improve cosine response and filter out undesired wavelengths. In the case of sunlight, light from the sun, at dawn or dusk, will be at a shallow angle and the optical filter is capable of redirecting the light to be normal to the photosensitive surface of the photodiode. In other embodiments, the optical filter is capable of filtering the wavelengths of light not useful for photosynthesis, thereby providing a measure of photosynthetic active radiation (PAR) available to either generally or to a particular species of plant.

The photodiode allows a proportion of current to pass through that varies with respect to the number of photons striking its surface. Therefore the more light, the faster it charges the reference capacitor.

The reference capacitor must have a capacitance that does not vary much with temperature, pressure, or other environmental variable for accurate and precise measurements. As long as the actual capacitance does not change from one reading to the next, variances for individual capacitors can be compensated for in the software.

The tri-state buffer built into the microprocessor unit can be a source or sink of current, or operate in an input mode. It is in this way it is able to observe the exact moment that a predefined potential has been reached in the capacitor. Once that potential is reached, an interrupt mechanism in the microprocessor unit can save a snapshot of the number of ticks that have elapsed from the reference clock.

A high speed, high accuracy reference clock is used to measure the amount of time it takes to charge the capacitor. This is usually external to the microcontroller unit, though not necessarily.

The reference clock counter is a special register in the microcontroller that automatically monitors and counts the number of ticks from the reference clock that is stopped automatically when an event occurs at the tri-state buffer or gate.

The microprocessor unit also runs software which, by running these light measurement tests in constant succession, accumulates these measurements into the microprocessor's RAM so as to give one an idea of the total amount of light a given area has received over a period of time. Calculations can then be done to convert this information into a rate at which photosynthetically active radiation accumulates. Further calculations can then be done to convert this information into units such as a daily light integral (DLI) or spot measurement units (such as micro-einsteins or umols of light).

What is claimed is:

1. A device comprising:
   (a) a means for collecting omni-directional light;
   (b) a means for measuring the quantity of omni-directional light collected by said means for collecting omni-directional light;
   (c) a means for negating the contribution of non-photosynthetically active radiation in the measured quantity of omni-directional light; and
   (d) a means for calculating the rate at which the quantity of photosynthetically active radiation collected by said means for collecting omni-directional light is accumulated.

2. The device of claim 1, wherein said means for collecting omni-directional light is a material conductive to light.

3. The device of claim 2, wherein said material conductive to light is selected from the group consisting of glass, quartz, plastic, fiberglass, and polymethylmethacrylate.

4. The device of claim 1, wherein said means for collecting omni-directional light directs the light to a light measurement component of a light measurement circuit.

5. The device of claim 4, wherein said means for collecting omni-directional light directs the light to at least one photodiode.

6. The device of claim 5, wherein said photodiode is comprised of a photovoltaic material.

7. The device of claim 6, where said photovoltaic material is selected from the group consisting of selenium compounds, silicon compounds, and carbon nanotubes.

8. The device of claim 7, wherein said at least once photodiode is wiredly connected to at least one capacitor such that said photodiode will charge said at least one capacitor.

9. The device of claim 1, wherein the means for negating the contribution of non-photosynthetically active radiation in the measured quantity of omni-directional light is the amplification of the signals of desired wavelengths of light.

10. The device of claim 1, wherein the means for negating the contribution of non-photosynthetically active radiation in the measured quantity of omni-directional light is a filter.

11. The device of claim 10, wherein said filter is selected from the group consisting of optical filters, analog filters, and digital filters.

12. The device of claim 8, wherein a tri-state gate is used to trigger a measurement of time when the voltage across said at least one capacitor reaches a pre-set value.

13. The device of claim 12, wherein the tri-state gate is bi-directional.

14. The device of claim 12, wherein at least one microprocessor stores the data light received by said at least one photodiode over a period of time.

15. The device of claim 1, wherein additional instrumentation can be modularly to said device.

16. The device of claim 15, wherein said additional instrumentation is selected from the group consisting of rainfall measurement sensors, barometers, hygrometers, pH meters, temperature sensors, and anemometers.

17. The device of claim 1, wherein said device further possesses a means to indicate whether the device is level.

18. The device of claim 17, wherein said means to indicate whether the device is level is a bubble type level indicator.

19. A device comprising:
   (a) a means for collecting omni-directional light and directing it to a photodiode;
   (b) a means for measuring the quantity of omni-directional light collected by said means for collecting omni-directional light comprising measuring the elapsed time for a photodiode to charge a capacitor;
   (c) a means for negating the contribution of non-photosynthetically active radiation in the measured quantity of omni-directional light;
   (d) a means for calculating the rate at which the quantity of photosynthetically active radiation collected by said means for collecting omni-directional light is accumulated;
   (e) a casing enclosing said light measurement circuit; and
   (f) a level indicator.

20. The device of claim 19, wherein said photodiode is composed of photovoltaic materials.

21. The device of claim 19, wherein said filter is selected from the group consisting of optical filters, analog filters, and digital filters.

22. The device of claim 19, wherein said casing possesses a means to attach to a stand.

23. The device of claim 19, wherein additional instrumentation can be modularly attached to said device.

24. The device of claim 23, wherein said additional instrumentation is selected from the group consisting of rainfall measurement sensors, barometers, hygrometers, pH meters, temperature sensors, anemometers, and other environmental variable measurement instruments known to those skilled in the art.

* * * * *